Dec. 4, 1956  N. G. KLING  2,772,578
POWER TRANSMISSION WITH DECLUTCHING
PROVISION FOR MANUAL OPERATION
Filed June 15, 1953

INVENTOR.
Nelson G. Kling
BY Edwin Lewsol +
Harry Cole
ATTORNEYS

United States Patent Office 2,772,578
Patented Dec. 4, 1956

2,772,578

POWER TRANSMISSION WITH DECLUTCHING PROVISION FOR MANUAL OPERATION

Nelson G. Kling, Roslyn, N. Y., assignor to Conitech, Ltd., New York, N. Y., a corporation of New York Application June 15, 1953, Serial No. 361,644

13 Claims. (Cl. 74—625)

This invention relates generally to improvements in power transmission apparatus and, more particularly, to improvements in a declutching provision therefor.

One object of the present invention is the provision, in a power transmission, of improved means for manually actuating a driven member in the event of power failure, said manual means being effective to automatically disengage the power means from operative association with the driven member when the manual means is operatively associated therewith.

Another object of the present invention is the provision, in a power transmission, of an improved crank arrangement for actuating a driven member in the event of power failure, the power means for actuating the driven member being automatically declutched from operative association with the driven member in response to the operative association with the driven member of a hand crank.

Yet another object of the present invention is the provision of a generally improved declutching provision of the aforenoted character which is simple in design and construction, relative inexpensive to manufacture, and highly efficient in the accomplishment of its intended purpose.

The above and other objects, features and advantages of the present invention will be more fully understood from the following description considered in connection with the accompanying illustrative drawing.

In the drawing which illustrates the best mode now contemplated by me for carrying out my invention:

Figure 1:
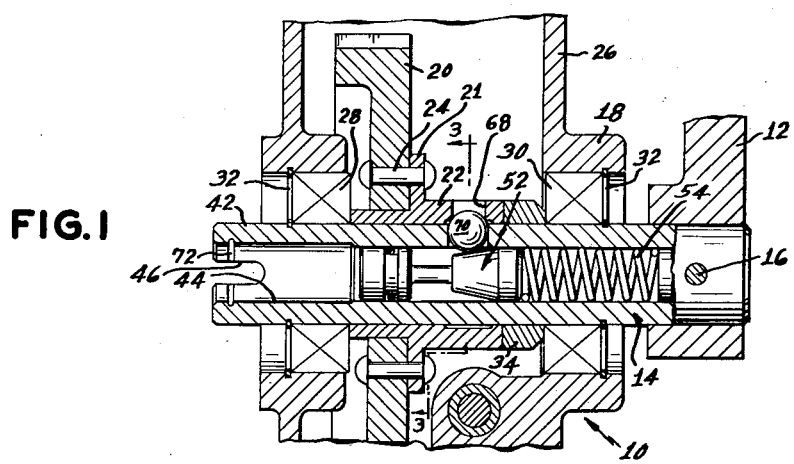
Fig. 1 is a fragmentary vertical sectional view of power transmission apparatus formed according to the present invention, with the crank shown disengaged from the apparatus.

With reference to the drawing in detail, the power transmission apparatus 10 of the present invention, while of general application, is eminently suitable for association in the respirator pump apparatus fully shown and described in the copending application of Thomas C. Huxley III, Serial No. 295,181, filed June 24, 1952 for Pump and Control Unit for Respirators, and assigned to the assignee of the present invention. Thus, the power transmission apparatus 10 is generally of the type fully shown and described in the above referred to copending application with the exception of the declutching provision which will be described in detail hereinafter. Accordingly the power transmission apparatus 10 of the present invention may be used to transmit power to drive respirator pumping apparatus to periodically supply air to, and withdraw air from, a cuirass which is operatively associated with such pumping apparatus.

The crank arm 12 of the instant apparatus is keyed to the shaft 14 by means of the pin 16, said shaft constituting the low speed or output shaft of the speed reducer, indicated generally at 18. The speed reducer 18 is of the general construction fully shown and described in the aforereferred to copending application and is adapted to reduce the speed of shaft 14 relative to the speed of the input shaft of the speed reducer. It will be understood that the input shaft of the apparatus 10 is adapted to be power driven by means of a suitable motor (not shown). When the power transmission apparatus 10 is power driven by means of a suitable motor, the gear 20 of reducer 18 is drivingly connected to the shaft 14, the gear 20 having an inner portion thereof fixed to the flange 21 of the intermediate shaft 22 by means of suitable fastener elements 24. The rotation of the intermediate shaft 22 when gear 20 is power driven will be effective to transmit its motion to the shaft 14 through the intermediation of the clutching provision to be described in detail hereinafter. The apparatus 10 is provided with a suitable housing 26 for enclosing the transmission mechanism and the shaft 14 is journaled for rotation or oscillation in the bearings 28 and 30 which are retained in position in housing 26 by means of suitable snap rings 32. Intermediate portions of the shaft 14 are also journaled for rotation in the intermediate shaft 22 which is apertured therethrough for the reception of the shaft 14, the latter constituting the output shaft of the instant apparatus. It will be noted that a suitable spacer element 34 is interposed between the intermediate shaft 22 and the bearing 30, said spacer element being suitably apertured for the reception therethrough of the shaft 14. It will be readily apparent from the above that the rotation or oscillation of the drive shaft 14 will be effective to transmit its motion to the crank arm 12 which may be connected to any suitable mechanism to be driven, for example a pump in respirator pumping apparatus.

In the normal operation of the apparatus 10 the shaft 14 will be power driven, and in the event of power failure there is provided alternate manually operated means for actuating the shaft 14 and concomitantly the driven member 12. The alternate manually operated means comprises a crank 36 having a handle 38 and a laterally projecting portion 40, the latter, when operatively associated with the apparatus 10, being adapted to automatically declutch the speed reducer 18 from the shaft 14. Accordingly when crank 36 is operatively connected to the apparatus 10 the train of gears disposed in the speed reducer 18 is declutched from the output shaft 14 whereby to permit, and facilitate the ease of manual operation of the driven member 12. The shaft 14 has a portion 42 which is apertured as indicated at 44, the latter being adapted for the reception of the portion 40 of the crank 36. The shaft portion 42 is slotted at diametrically opposite portions as indicated at 46 for the reception of the projecting pins 48 which project laterally outwardly of the crank portion 40. It will be understood that crank 36 may be operatively associated with the shaft 14 in one position only with the handle 38 of the crank being disposed in upstanding disposition for the manual oscillation thereof.

The aperture 50, which constitutes an extension of the aperture 44, has positioned therein an axially movable plunger 52, the latter being spring biased outwardly of aperture 50 by means of a light compression spring 54 seated in the end of said aperture. The plunger 52 comprises an inclined portion 56 and an intermediate portion of reduced diameter 58, the latter projecting from the forward part 60 of said plunger. The part 60 of plunger 52 is provided with a peripherally extending groove 62 which is adapted for the reception of a suitable annular oil seal 64. The shaft 14 is provided with a series of three transversely disposed apertures 66 which extend through the wall of said shaft and communicate with the aperture 50 thereof. In the illustrated embodiment the transverse apertures 66 are uniformly peripherally spaced and are accordingly spaced apart approximately 120°. The intermediate shaft 22 is similarly provided with three transversely disposed apertures 68 which are peripherally spaced corresponding to the spacing of the apertures 66 and are adapted to align therewith when gear 20 is operatively associated with shaft 14. Forming part of the clutching mechanism aforedescribed are a series of three balls 70 which are dimensioned complementary to apertures 66 and 68 and are adapted to coact with their associated structure in a manner to be described in detail hereinafter.

Figure 3:
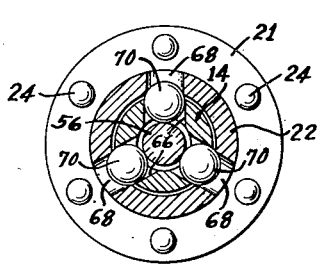
Fig. 3 is a sectional view taken on the line 3—3 of Fig. 1.

When the crank 36 is operatively disassociated from the shaft 14, as shown in Figs. 1 and 3, the balls 70 will coact with the inclined portion 56 of plunger 52 to project said balls into the apertures 68 of the shaft 22. Accordingly when the crank 36 is removed from the shaft 14 the spring 54 will coact with the plunger 52 whereby the inclined portion 56 of said plunger will move balls 70 outwardly on the alignment of the apertures 66 and 68. The axially movable plunger 52 is received in aperture 50 with a slight amount of clearance and the tangent of the angle of the inclined portion 56 relative to the axis thereof is preferably equal to, or less than, the coefficient of friction between the balls 70 and plunger 52, said balls and plunger being preferably formed of steel. Accordingly, the angle of inclination of the portion 56 is approximately 5° when the balls and plunger are formed of steel and the spring 54 may be a relatively light spring whose sole function is to bias the plunger 52 towards the shaft portion 42. The spring 54 is effective to move plunger 52 to urge each ball 70 outwardly an equal amount with the axis of said plunger coinciding with the center of the triangle formed by joining the centers of said balls. From the above it will be apparent that when the crank 36 is disassociated from shaft 14 the balls 70 will be effective to key shaft 22 to shaft 14 whereby the rotation of the gear 20 will be effective to concomitantly rotate the shaft 14.

Figure 2:
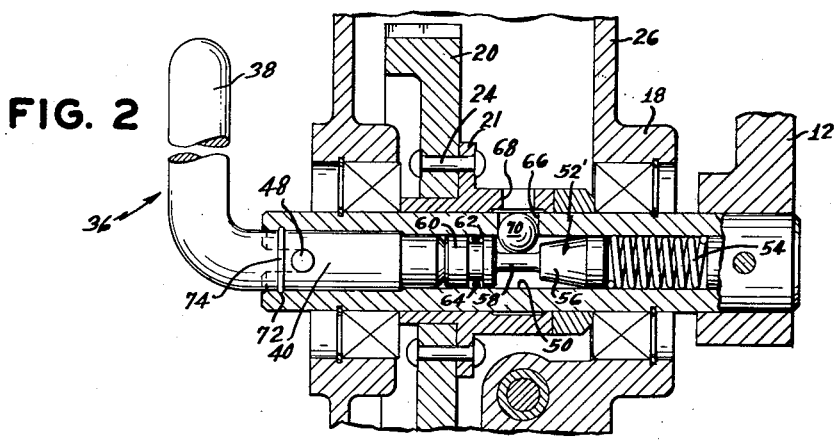
Fig. 2 is a view similar to Fig. 1 showing the crank engaged in the apparatus.
Figure 4:
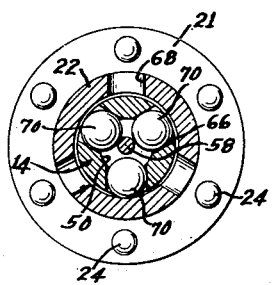
Fig. 4 is a view similar to Fig. 3 showing the position of the parts with the crank engaged in the apparatus.

If desired for certain applications, a clutch release effect may be produced by providing an angle of inclination of portion 56 greater than the coefficient of friction between the balls 70 and the plunger 52, it being understood that the release pressure for the clutch will be a function of said angle of inclination. Thus, if desired, a clutch release effect may be produced in the aforedescribed manner whereby on encountering a load of a predetermined amount balls 70 will be displaced from the apertures 68. When the crank 36 is operatively associated with shaft 14 through the cooperative association of slots 46 and pins 48, the portion 40 of said crank will axially move plunger 52 inwardly so as to displace the balls 70 from the apertures 68 of the intermediate shaft 22, as clearly shown in Figs. 2 and 4. Thus, when the portion 40 is operatively associated with shaft 14 in the aforedescribed manner the balls 70 will ride down the inclined portion 56 for association with the portion 58 of plunger 52. Thus, the reduced portion 58 of the plunger when aligned with the apertures 66 permits the balls 70 to be retracted from the apertures 68 so as to declutch the shafts 14 and 22 from each other. From the above it will be apparent that when the crank 36 is operatively associated with the shaft 14 the plunger 52 will be axially moved from the position 52 to the position 52', said movement being effective to disconnect gear 20 from operative association with shaft 14. It will be readily apparent that the shafts 14 and 22 will be fixed against relative rotation when the plunger 52 is disposed outwardly as shown in Figs. 1 and 3, said disposition of said plunger being effective to project balls 70 into the apertures 68 of shaft 22 when said apertures are aligned with the apertures 66 of shaft 14. In the event of power failure the hand crank 36 will be operatively associated with the apparatus 10 in the aforedescribed manner and the handle 38 of said crank will be manually oscillated for correspondingly actuating the driven member or crank pin 12. The shaft portion 42 of shaft 14 has an annular recess 72 adjacent its outer end for the reception of the snap ring 74 of crank 36 when the latter is engaged in aperture 44. It is to be noted that the balls 70 will be effective to limit the outward movement of the plunger 52 to its disposition shown in Figs. 1 and 3.

It will be evident from the above that the power transmission 10 is provided with improved means for manually actuating the driven member 12 in the event of power failure, said manual means being effective to automatically disengage the power means from operative association with member 12 when the manual means is operatively associated therewith.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. In power transmission apparatus having driven means, a drive shaft operatively associated with said driven means, driving means for actuating said shaft, said driving means comprising a member having at least one aperture, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture and having a reduced portion, the latter having a movable element operatively associated therewith, said shaft having an aperture adapted to align with said member aperture when said driving means is operatively associated with said shaft, said member being axially movable from a first position in which said apertures are aligned with said movable element extending therein whereby said driving means is operatively associated with said shaft to a second position in which said movable element is retracted from said member aperture and is associated with said reduced portion whereby said driving means is operatively disassociated from said shaft, said manual means comprising a crank having a portion thereof adapted to cooperate with said member when the former is operatively associated with said shaft, said member being automatically movable from said first position to said second position in response to the cooperative association with said member of said crank portion.

2. In power transmission apparatus having driven means, a drive shaft operatively associated with said driven means, driving means for actuating said shaft, said driving means comprising a member having at least one aperture, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture and having a reduced portion, the latter having a movable element operatively associated therewith, said shaft having an aperture adapted to align with said member aperture when said driving means is operatively associated with said shaft, said member being axially movable from a first position in which said apertures are aligned with said movable element extending therein whereby said driving means is operatively associated with said shaft to a second position in which said movable element is retracted from said member aperture and is associated with said reduced portion whereby said driving means is operatively disassociated from said shaft, said manual means comprising a crank having a portion thereof adapted to cooperate with said member when the former is operatively associated with said shaft, said member being automatically movable from said first position to said second position in response to the cooperative association with said member of said crank portion, said crank portion and said shaft having cooperating means whereby the former is insertable in the latter in one position only.

3. In power transmission apparatus having driven means, a drive shaft operatively associated with said driven means, driving means for actuating said shaft, said driving means comprising a member having at least one aperture, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture and having a reduced portion, the latter having a movable element operatively associated therewith, said shaft having an aperture adapted to align with said member aperture when said driving means is operatively associated with said shaft, said member being axially movable from a first position in which said apertures are aligned with said movable element extending therein whereby said driving means is operatively associated with said shaft to a second position in which said movable element is retracted from said member aperture and is associated with said reduced portion whereby said driving means is operatively disassociated from said shaft, said manual means comprising structure having a portion thereof adapted to cooperate with said member when the former is operatively associated with said shaft, said member being automatically movable from said first position to said second position in response to the cooperative association with said member of said portion of said structure, said member having means cooperatively associated therewith for biasing the former to said first position.

4. In power transmission apparatus having driven means, a drive shaft operatively associated with said driven means, driving means for actuating said shaft, said driving means comprising a member having a plurality of peripherally spaced apertures, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture and having a reduced portion, the latter having ball elements adapted for operative association therewith, said shaft having a plurality of transversely disposed apertures communicating with said shaft aperture, said transverse apertures being peripherally spaced corresponding to the spacing of said member apertures and adapted to align therewith when said driving means is operatively associated with said shaft, said member being axially movable from a first position in which said member and transverse apertures are aligned with said ball elements extending therein whereby said driving means is operatively associated with said shaft to a second position in which said ball elements are retracted from said member apertures and are associated with said reduced portion whereby said driving means is operatively disassociated from said shaft, said manual means comprising structure having a portion thereof adapted to cooperate with said member when the former is operatively associated with said shaft, said member being automatically movable from said first position to said second position in response to the cooperative association with said member of said portion of said structure.

5. In power transmission apparatus having driven means, a drive shaft operatively associated with said driven means, driving means for actuating said shaft, said driving means comprising a member having a plurality of peripherally spaced apertures, manual means for actuating said shaft independent of said driving means, and means for disconnecting said driving means from operative association with said shaft when said manual means is operatively associated with said shaft, said shaft being apertued and said last mentioned means comprising an axially movable member disposed in said aperture, said member comprising an inclined portion and a reduced portion, said portions having a plurality of ball elements operatively associated therewith, said shaft having a plurality of transversely disposed apertures communicating with said shaft aperture, said transverse apertures being peripherally spaced corresponding to the spacing of said member apertures and adapted to align therewith when said driving means is operatively associated with said shaft, said member being axially movable from a first position in which said member and transverse apertures are aligned with said ball elements extending therein whereby said driving means is operatively associated with said shaft to a second position in which said ball elements are retracted from said membmer apertures and are associated with said reduced portion whereby said driving means is operatively disassociated from said shaft, the cooperative association of said ball elements with said inclined portion being effective to project the former into said member apertures, said manual means comprising structure having a portion thereof adapted to cooperate with said member when the former is operatively associated with said shaft, said member being automatically movable from said first position to said second position in response to the cooperative association with said member of said portion of said structure.

6. In power transmission apparatus having driven means, a drive shaft operatively associated with said driven means, driving means for actuating said shaft, said driving means comprising a member having a plurality of peripherally spaced apertures, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture, said member comprising an inclined portion and a reduced portion, said portions having a plurality of ball elements operatively associated therewith, said shaft having a plurality of transversely disposed apertures communicating with said shaft aperture, said transverse apertures being peripherally spaced corresponding to the spacing of said member apertures and adapted to align therewith when said driving means is operatively associated with said shaft, said member being axially movable from a first position in which said member and transverse apertures are aligned with said ball elements extending therein whereby said driving means is operatively associated with said shaft to a second position, in which said ball elements are retracted from said member apertures and are associated with said reduced portion whereby said driving means is operatively disassociated from said shaft, the cooperative association of said ball elements with said inclined portion being effective to project the former into said member apertures, said manual means comprising structure having a portion thereof adapted to cooperate with said member when the former is operatively associated with said shaft, said member being automatically movable from said first position to said second position in response to the cooperative association with said member of said portion of said structure, said inclined portion being disposed at an angle of approximately 5° with the axis of said member when the latter and said ball elements are formed of steel.

7. In power transmission apparatus having driven means, a drive shaft operatively associated with said driven means, driving means for actuating said shaft, said driving means comprising a member having a plurality of peripherally spaced apertures, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture, said member comprising an inclined portion and a reduced portion, said portions having a plurality of ball elements operatively associated therewith, said shaft having a plurality of transversely disposed apertures communicating with said shaft aperture, said transverse apertures being peripherally spaced corresponding to the spacing of said member apertures and adapted to align therewith when said driving means is operatively associated with said shaft, said member being axially movable from a first position in which said member and transverse apertures are aligned with said ball elements extending therein whereby said driving means is operatively associated with said shaft to a second position in which said ball elements are retracted from said member apertures and are associated with said reduced portion whereby said driving means is operatively disassociated from said shaft, the cooperative association of said ball elements with said inclined portion being effective to project the former into said member apertures, said manual means comprising structure having a portion thereof adapted to cooperate with said member when the former is operatively associated with said shaft, said member being automatically movable from said first position to said second position in response to the cooperative association with said member of said portion of said structure, said inclined portion being disposed at an angle the tangent of which is not greater than the coefficient of friction between said last mentioned portion and said ball elements.

8. In power transmission apparatus having driven means, a drive shaft operatively associated with said driven means, driving means for actuating said shaft, said driving means comprising a member having a plurality of peripherally spaced apertures, manual means for actuating said shaft independent of said driving means, and means for disconnecting said driving means from operative association with said shaft when said manual means is operatively associated with said shaft, said shaft being apertured and said last mentioned means comprising an axially movable member disposed in said aperture, said member comprising an inclined portion and a reduced portion, said portions having a plurality of ball elements operatively associated therewith, said shaft having a plurality of transversely disposed apertures communicating with said shaft aperture, said transverse apertures being peripherally spaced corresponding to the spacing of said member apertures and adapted to align therewith when said driving means is operatively associated with said shaft, said member being axially movable from a first position in which said member and transverse apertures are aligned with said ball elements extending therein whereby said driving means is operatively associated with said shaft to a second position in which said ball elements are retracted from said member apertures and are associated with said reduced portion whereby said driving means is operatively disassociated from said shaft, the cooperative association of said ball elements with said inclined portion being effective to project the former into said member apertures, said manual means comprising structure having a portion thereof adapted to cooperate with said member when the former is operatively associated with said shaft, said member being automatically movable from said first position to said second position in response to the cooperative association with said member of said portion of said structure, said inclined portion being disposed at an angle the tangent of which is greater than the coefficient of friction between said last mentioned portion and said ball elements whereby to provide for the displacement of said ball elements from said member apertures when said shaft is actuated by said driving means on encountering a predetermined load in said driven means.

9. In power transmission apparatus, driven means, driving means for actuating said driven means, manual means for actuating said driven means independent of said driving means, and means for disconnecting said driving means from operative association with said driven means when said manual means is operatively associated therewith, said last mentioned means comprising a movable member having a first position in which said driving means is operatively associated with said driven means and a second position in which said manual means is operatively associated with said driven means and said driving means is disconnected from operative association therewith, said movable member being automatically movable from said first position to said second position in response to the cooperative association with said member of manual driving means constituting a part of said manual means when said driving means is operatively associated with a complementary part of said manual means, and means providing for the movement of said movable member from said first position to said second position when said driven means is actuated by said driving means on encountering a predetermined load in said driven means.

10. Power transmission apparatus comprising driving means, driven means coaxial with said driving means, and means for operatively connecting said driving means releasably to said driven means comprising radially movable ball means releasably engageable with said driving and driven means, and means movable coaxially of said driving and driven means for releasably holding said ball means in said engagement with said driving and said driven means, and manually operable means mounted for movement coaxially of said driven means to move said holding means to a position in which it is inoperative to hold said ball means in said engagement with said driving means, said manually operable means and said driven means having complementary interengageable provisions whereby said driven means may be operated manually independently of said driving means.

11. Power transmission apparatus comprising driving means, driven means coaxial with said driving means, and means for operatively connecting said driving means releasably to said driven means comprising radially movable ball means releasably engageable with said driving and driven means, and means movable coaxially of said driving and driven means for releasably holding said ball means in said engagement with said driving and said driven means, said holding means having an inclined portion engageable with said ball means for holding the latter in engagement with said driving and driven means, said portion being inclined to the axis of said driving and driven means and the angle of inclination being such than the tangent bears a predetermined relation to the coefficient of friction between said inclined portion and said ball means whereby to predetermine the action of said holding means in relation to said ball means, said driven means having an open ended axial bore for the reception of manual driving means, the latter being engageable in said bore in driving relation with said driven means and when so engaged being operative to retain said holding means in a position in which it is inoperative to hold said ball means in said engagement with said driving means.

12. Power transmission apparatus comprising driving means, driven means coaxial with said driving means, and means for operatively connecting said driving means releasably to said driven means comprising radially movable ball means releasably engageable with said driving and driven means, and means movable coaxially of said driving and driven means for releasably holding said ball means in said engagement with said driving and said driven means, said holding means having an inclined portion engageable with said ball means for holding the latter in engagement with said driving and driven means, said portion being inclined to the axis of said driving and driven means and the angle of inclination being such that the tangent bears a predetermined relation to the coefficient of friction between said inclined portion and said ball means whereby to predetermine the action of said holding means in relation to said ball means, said coefficient of friction being less than the tangent of said angle, said driven means having an open ended axial bore for the reception of manual driving means, the latter being engageable in said bore in driving relation with said driven means and when so engaged being operative to retain said holding means in a position in which it is inoperative to hold said ball means in said engagement with said driving means.

13. Power transmission apparatus comprising driving means, driven means coaxial with said driving means, and means for operatively connecting said driving means releasably to said driven means comprising radially movable ball means releasably engageable with said driving and driven means, and means movable coaxially of said driving and driven means for releasably holding said ball means in said engagement with said driving and said driven means, said holding means having an inclined portion engageable with said ball means for holding the latter in engagement with said driving and driven means, said portion being inclined to the axis of said driving and driven means and the angle of inclination being such that the tangent bears a predetermined relation to the coefficient of friction between said inclined portion and said ball means whereby to predetermine the action of said holding means in relation to said ball means, said coefficient of friction being greater than the tangent of said angle, said driven means having an open ended axial bore for the reception of manual driving means, the latter being engageable in said bore in driving relation with said driven means and when so engaged being operative to retain said holding means in a position in which it is inoperative to hold said ball means in said engagement with said driving means.

References Cited in the file of this patent
UNITED STATES PATENTS

| | | |
|---|---|---|
| 817,309 | Flynt | Apr. 10, 1906 |
| 999,088 | Beede et al. | July 25, 1911 |
| 1,936,665 | Gauthier | Nov. 28, 1933 |
| 2,327,980 | Bryant | Aug. 31, 1943 |
| 2,632,341 | Arp | Mar. 24, 1953 |